(12) United States Patent
Mandrachia et al.

(10) Patent No.: US 11,071,141 B2
(45) Date of Patent: Jul. 20, 2021

(54) METHODS AND APPARATUS FOR A CONTROL STATION

(71) Applicant: Illinois Tool Works Inc., Glenview, IL (US)

(72) Inventors: Steven J. Mandrachia, Eagleville, PA (US); John A. Gorczyca, Lansdale, PA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/590,501

(22) Filed: Oct. 2, 2019

(65) Prior Publication Data

US 2020/0112986 A1 Apr. 9, 2020

Related U.S. Application Data

(60) Provisional application No. 62/741,254, filed on Oct. 4, 2018.

(51) Int. Cl.
| | |
|---|---|
| *G06F 15/173* | (2006.01) |
| *H04W 74/06* | (2009.01) |
| *G05B 19/05* | (2006.01) |
| *H04L 29/06* | (2006.01) |

(52) U.S. Cl.
CPC .......... *H04W 74/06* (2013.01); *G05B 19/054* (2013.01); *H04L 69/26* (2013.01); *G05B 2219/1105* (2013.01)

(58) Field of Classification Search
CPC ................. H04W 74/06; G05B 19/054; G05B 2219/1105; H04L 69/26
USPC ........................................................ 709/223
See application file for complete search history.

(56) References Cited

U.S. PATENT DOCUMENTS

| | | | | |
|---|---|---|---|---|
| 6,269,398 | B1* | 7/2001 | Leong | H04L 41/0213 703/21 |
| 9,973,831 | B2* | 5/2018 | Mejegard | G08G 1/20 |
| 9,986,311 | B2* | 5/2018 | Mejegard | G06Q 10/06 |
| 10,001,765 | B2* | 6/2018 | Burt | G05B 19/042 |
| 10,104,453 | B2* | 10/2018 | Mejegard | H04Q 9/00 |
| 10,191,870 | B2* | 1/2019 | Vettical | E21B 47/008 |

(Continued)

FOREIGN PATENT DOCUMENTS

WO 2013134721 9/2013

OTHER PUBLICATIONS

Int'l Search Report and Written Opinion Appln. No. PCT/US2019/054417 dated Nov. 26, 2019 (11 pgs.).

*Primary Examiner* — Alicia Baturay
(74) *Attorney, Agent, or Firm* — McAndrews, Held & Malloy, Ltd.

(57) ABSTRACT

Provided is a control station that may be configured to control and/or monitor various devices, such as, for example, industrial devices. The control station may comprise communication circuitry, a first processor, and a second processor configured to communicate with one or more devices via the communication circuitry. Information from the one or more devices are configured to be processed by at least one of the first processor and the second processor, and at least one of the first processor and the second processor is configured to output the processed information to one or more of: an electronic display of the control station, a display external to the control station, and a server.

20 Claims, 5 Drawing Sheets

(56) References Cited

U.S. PATENT DOCUMENTS

| | | | |
|---|---|---|---|
| 2015/0046932 A1* | 2/2015 | Kim | G06F 1/3293 719/313 |
| 2018/0242100 A1* | 8/2018 | Gandhi | H04W 88/10 |

* cited by examiner

METHODS AND APPARATUS FOR A CONTROL STATION

CLAIM OF PRIORITY

This patent application makes reference to, claims priority to and claims benefit from U.S. Provisional Patent Application Ser. No. 62/741,254, filed on Oct. 4, 2018. The above identified application is hereby incorporated herein by reference in its entirety.

BACKGROUND

The present disclosure relates to an electronic device configured to communicate with other electronic devices, and more particularly, to a control station.

Limitations and disadvantages of conventional systems for a control station will become apparent to one of skill in the art, through comparison of such approaches with some aspects of the present method and system set forth in the remainder of this disclosure with reference to the drawings.

SUMMARY

Methods and systems are provided for a control station, substantially as illustrated by and described in connection with at least one of the figures, as set forth more completely in the claims.

BRIEF DESCRIPTION OF THE DRAWINGS

These and/or other aspects will become apparent and more readily appreciated from the following description of some example embodiments, taken in conjunction with the accompanying drawings.

The drawings are not necessarily to scale. Where appropriate, similar or identical reference numbers are used to identify similar or identical elements.

DETAILED DESCRIPTION

A control station is used, for example, to control one or more devices for a factory, assembly line, conveyor belt, etc. For example, a control station may be used to control/monitor at least one static charging/neutralizing device and/or at least one sensor device configured to determine surface potential of target object(s). While a control station may be used to control/monitor a specific group of devices that may be related, such as, for example, a static charging/neutralizing device and a sensor device configured to determine surface potential of target object(s), a control station with appropriate functionality may also be used to control/monitor a variety of devices.

Accordingly, as an example, it can be appreciated that a control station of the present disclosure may communicate with the specific group of products, which may be from a first manufacturer and use a first communication protocol, which may be proprietary or non-proprietary. Various aspects of the disclosure may also provide for a control station that can additionally communicate with devices such as, for example, a PLC and/or additional industrial devices that may be from a second manufacturer and use a second communication protocol, which may be proprietary or non-proprietary.

Figure 1:
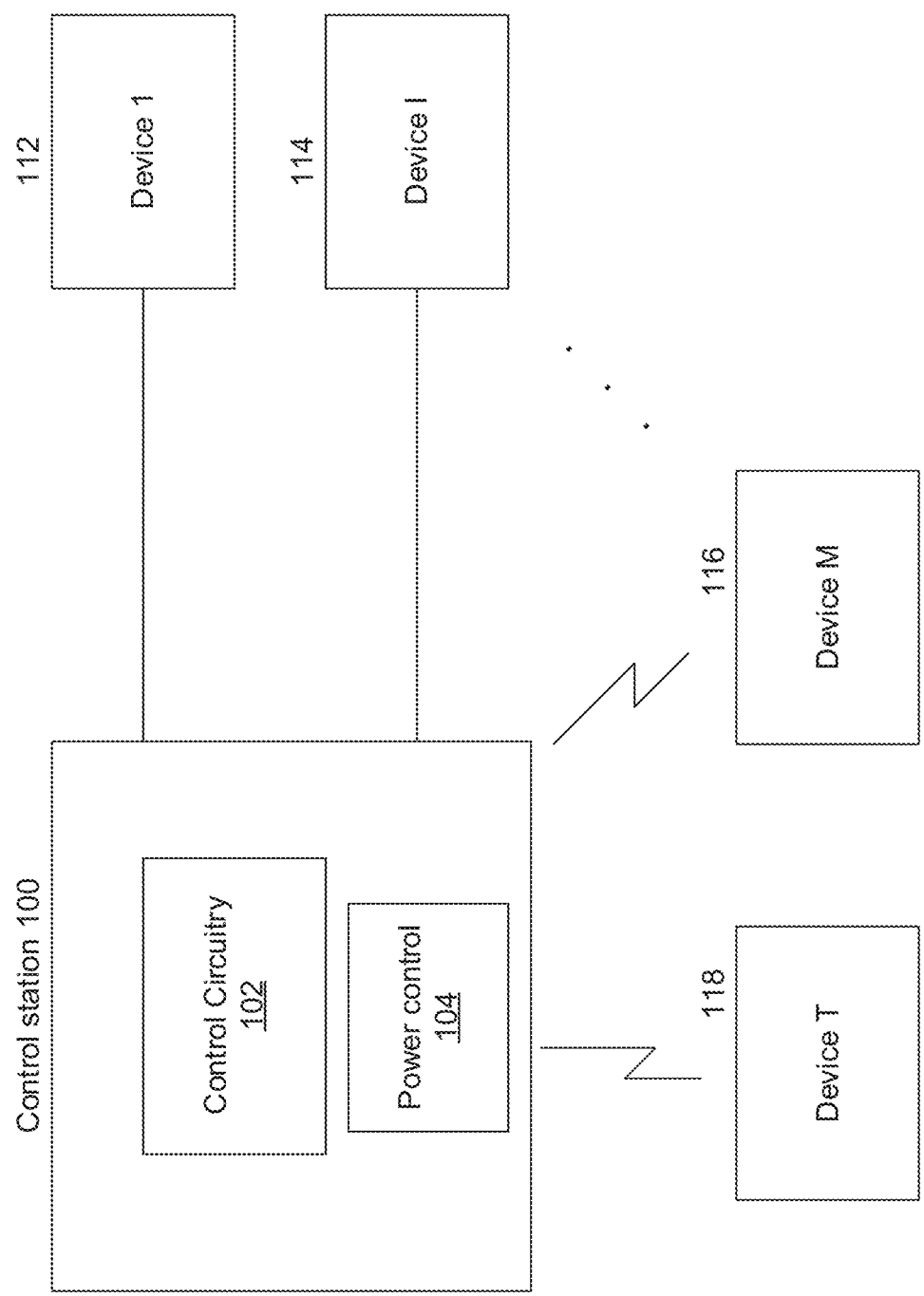
FIG. 1 is a drawing of an example control station, in accordance with aspects of the disclosure.

FIG. 1 is a drawing of an example control station, in accordance with aspects of the disclosure. Referring to FIG. 1, there is shown a control station 100 comprising control circuitry 102, a first device 112, a second device 114, a third device 116, and a fourth device 118. There is also shown a power control circuitry 104. This example shown in FIG. 1 is limited to four devices for the sake of brevity. However, there should not be any inference taken that various aspects of the disclosure are limited to having only or at most four devices communicating with the control station 100. Various aspects of the control station 100 may be used for different number of devices.

The control station 100 may be used to, for example, receive surface potential of a target object from the first device 112. The surface potential may then be used by the control circuitry 102 to control the second device 114 to generate a ratio of positive ions to negative ions in airflow to a target device. The device 114 may be, for example, a static charging device such as, for example, air ionizing blower.

The first device 112 may be, for example, an electro-static voltmeter configured to measure the surface potential of the target object directly, or the first device 112 may be, for example, an electro-static field meter configured to indirectly infer the surface potential of the target object by measuring the electric field of the target surface. The surface potential may be used to control the second device 114 in generation of ions.

The second device 114 may be a static charging device that may be used to neutralizing static charge on a surface or apply a static charge on a surface. Static charge may be neutralized to alleviate surfaces sticking to each other. For example, rolls of newspaper paper may have the surface static charge neutralized to prevent the paper from sticking to itself. In other applications, for example, where plastic bags are stacked, some static charge on the plastic bags may be useful in keeping the stack together.

When the first device 112 provides signals that are not surface potentials, those signals may be processed by the control station 100. The control station 100 may then use the processed signals to control the second device 114. The processed signals may indicate a surface potential or indication of some other reference. Various aspects of the disclosure may provide for the control station 100 to be connected to the first device 112 and the second device 114 via a wired connection. However, other aspects of the disclosure may provide a wireless connection between the control station 100 and one or both of the first device 112 and the second device 114.

The third device 116 may be, for example, a programmable logic controller (PLC) and the fourth device 118 may be another electronic device that may communicate information with the control station 100. The third device 116 may be used to control the first device 112 and the second device 114 in conjunction with the control station 100 or in place of the control station 100. The fourth device 118 may be, for example, a user interface configured to allow a user to input information and/or commands, and also display status provided by the control station 100. Accordingly, the fourth device 118 may be a dedicated user interface device, an application running on a PC, laptop, a tablet PC, a smartphone, etc.

Various aspects of the disclosure may provide for multiple processors in the control circuitry 102 (discussed in more detail with respect to FIG. 2). Multiple processors may allow for sharing tasks to allow faster execution. For example, when the control station 100 is configured to control/monitor multiple devices, a first processor may be used to perform polling, or otherwise communicate with the multiple devices in real time, while a second processor may be used to perform other tasks such as, for example, receive inputs from a user interface, provide outputs to the user interface, communicate with external electronic devices, etc.

As the first processor is now free to concentrate on controlling/monitoring the multiple devices, communication with between the control station 100 and multiple devices can happen at faster intervals to allow more up-to-date control/monitoring. Accordingly, this has the effect of stabilizing the messaging time base and improving message throughput. That is, the messaging time base comprising polling periods for all devices connected to the control station 100 need not be delayed for a given polling when a control station with a single processor is occupied with tasks not related to polling.

Various aspects of the disclosure may provide for the control station 100 to be connected to the third device 116 and the fourth device 118 via a wireless connection. However, other aspects of the disclosure may provide a wired connection between the control station 100 and one or both of the third device 116 and the fourth device 118.

While specific devices were disclosed as being controlled by the control station 100, various aspects of the disclosure may provide for the control station 100 to control, monitor, communicate, etc. with other devices.

The power control circuitry 104 may handle power input to the control station 100 and power provided to one or more of the devices 112-118. Accordingly, the power control circuitry 104 may convert the input power to appropriate voltage(s) and current(s) for use by the control station 100, as well as any of the devices 112-118.

Figure 2B:
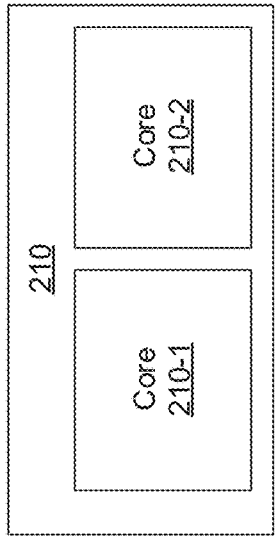
FIG. 2B is a drawing of an example processor for the control circuitry of FIG. 2A, in accordance with aspects of the disclosure.
Figure 2C:
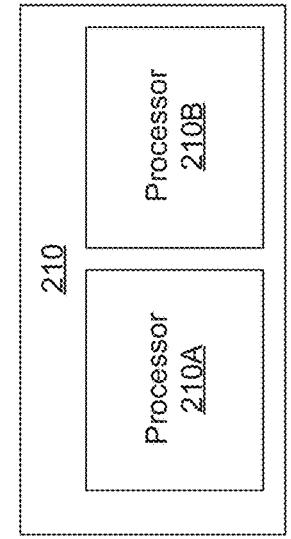
FIG. 2C is a drawing of another example processor for the control circuitry of FIG. 2A, in accordance with aspects of the disclosure.
Figure 2D:
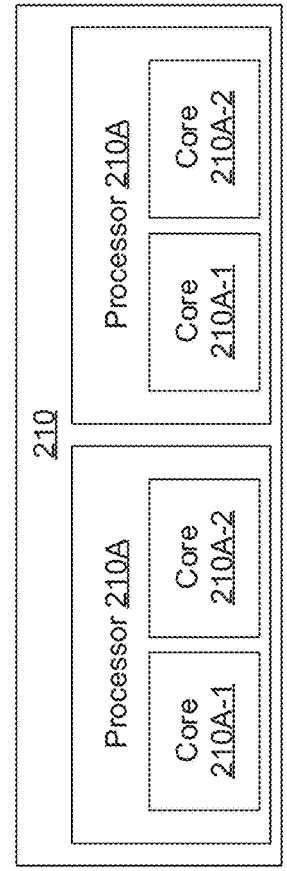
FIG. 2D is a drawing of yet another example processor for the control circuitry of FIG. 2A, in accordance with aspects of the disclosure.
Figure 2A:
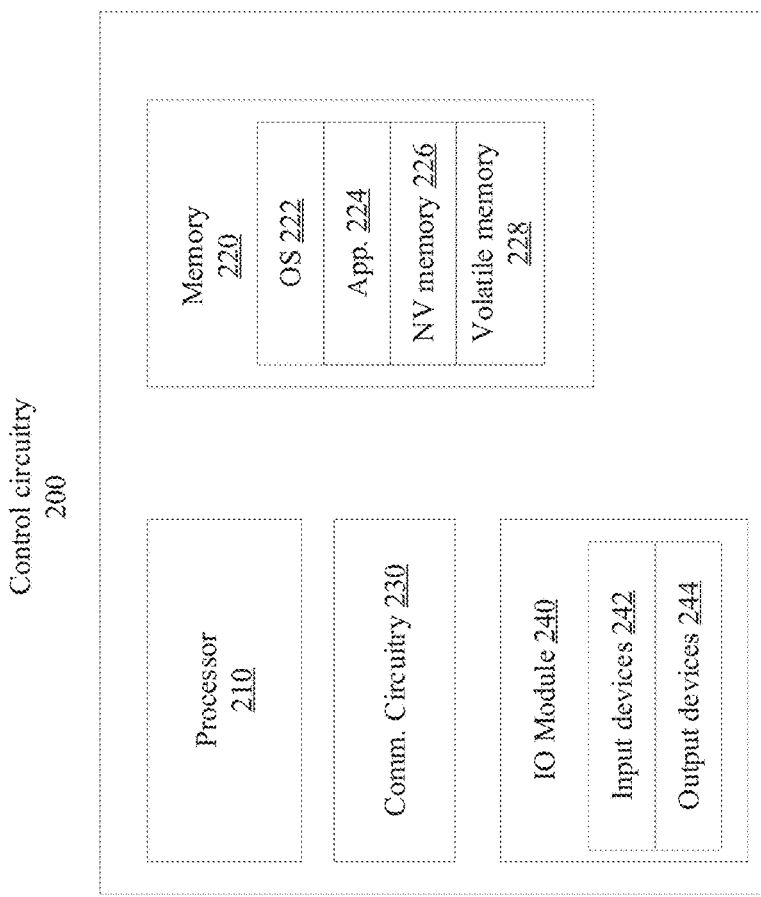
FIG. 2A is a drawing of an example control circuitry for a control station, in accordance with aspects of the disclosure.

FIG. 2A is a drawing of an example control circuitry for a control station. Referring to FIG. 2A, there is shown an example control circuitry 200 that may be used with various aspects of the disclosure. The control circuitry 200 may be similar to the control circuitry 102 of FIG. 1.

The control circuitry 200 may comprise, for example, a processor 210, memory 220, a communication circuitry 230, and an IO interface 240. The processor 210 may comprise, for example, one or more processors, where each of the one or more processors may comprise multiple cores. Accordingly, as an example, FIG. 2B shows the control circuitry 200 as one multi-core processor 210 comprising two cores 210-1 and 210-2. In another example, FIG. 2C shows the processor 210 as two discrete processors—a first processor 210A and a second processor 210B. In still another example, FIG. 2D shows the processor 210 as a first processor 210A comprising two cores 210A-1 and 210A-2 and a second processor 210B comprising two cores 210B-1 and 210B-2. Therefore, the disclosure does not limit the processor 210 as to the number of discrete processors nor the number of cores for each of the discrete processor(s). Accordingly, the processor 210 may range from a single processor-single core configuration to a multiple processor-multiple core configuration. For ease of description, the term "processor" may generically refer to a processor with one core or multiple cores, or to a core, as well as to various other hardware devices that are configured to execute code such as, for example, digital signal processors, graphic processor units, application specific ICs, etc. and/or logic circuitry that may replace or augment a processor or core.

The memory 220 may include non-volatile memory 226 and volatile memory 228. The storage described for holding local data may be part of the memory 220 or comprise separate memory. The operating system 222 and applications 224 may be stored in, for example, the non-volatile memory 226, and may be copied to volatile memory 228 for execution by the processor 210. Various aspects of the disclosure may use different memory architectures that are design and/or implementation dependent. For example, some aspects of the disclosure may have the operating system 222 and applications 224 in the non-volatile memory 226 executed at least in part from the non-volatile memory 226.

The communication circuitry 230 may allow the control circuitry 200 to communicate with other devices via, for example, a wired protocol such as USB, Ethernet, Firewire, etc., or a wireless protocol such as Bluetooth, Near Field Communication (NFC), Wi-Fi, etc. The wired or wireless protocol may be a non-proprietary protocol such as, for example, Controller Area Network (CAN) or Profibus, or a proprietary protocol. A proprietary protocol may have, for example, a fixed packet message format across all products. The various types of radios for communication may be referred to as a transceiver for the sake of simplicity. The communication may be, for example, with various sensors and/or devices. The communication circuitry 230 may also be used to communicate with other networks such as local networks, cellular networks, etc. Accordingly, the communication circuitry 230 may include one or more sockets to accept a wired cable.

The control circuitry 200 may also comprise the IO module 240 for communication with a user via the input devices 242 and output information to be displayed on output devices 244. The input devices 242 may comprise, for example, switches, slide switches, buttons, touch sensitive screen, which may be a part of a display, a microphone, etc. The input devices 242 may also comprise one or more sensors. The touch sensitive screen may have soft buttons, switches, slide switches, etc. that emulate their physical counterparts. The input devices 242 may also comprise, for example, various sensors, cameras, etc. The output devices 244 may comprise, for example, the display, a speaker, LEDs, vibration motor, etc.

The processor 210 may operate using different architectures in different embodiments. For example, the processor 210 may use the memory 220 to store instructions to execute, or the processor 210 may have its own memory (not shown) for its instructions.

Various embodiments may use other architectures where the different functionalities may be grouped differently. For example, the grouping may be in different integrated circuit chips. Or the grouping may combine different devices such as the IO module 240 and the communication circuitry 230 together, etc. Additionally, the control circuitry 200 may refer logically to various physical devices. For example, one or more of the output devices 244 may be at a different location than one or more of the input devices 242.

While various physical devices, including a touch panel, may be used to interface with the control station 100, voice may also be used to give commands or inputs to the control station 100. The voice input may be received by, for example, a microphone that is a part of the input devices 242 of the control circuitry 200. The digitized commands may be processed by, for example, the processor 210 to determine a specific command or response. The software for voice recognition may be part of, for example, the operating system 222 and/or the applications 224 in the memory 220.

Additionally, while power sources may generally be grouped separately from the control circuitry 200, various aspects of the disclosure may group a power source with the control circuitry 200. For example, the control station 100 may receive power wirelessly or via wire, and any power provided to one or more of the devices 112, 114, 116, and/or 118 may be provided wirelessly or via wire. In some configurations, the power control circuitry 104 may be considered to be a function of the I/O module 240 where the input devices 242 receives the power and manages the power to be used by the control station 100 and provided to any of the devices 112-118.

Figure 3:
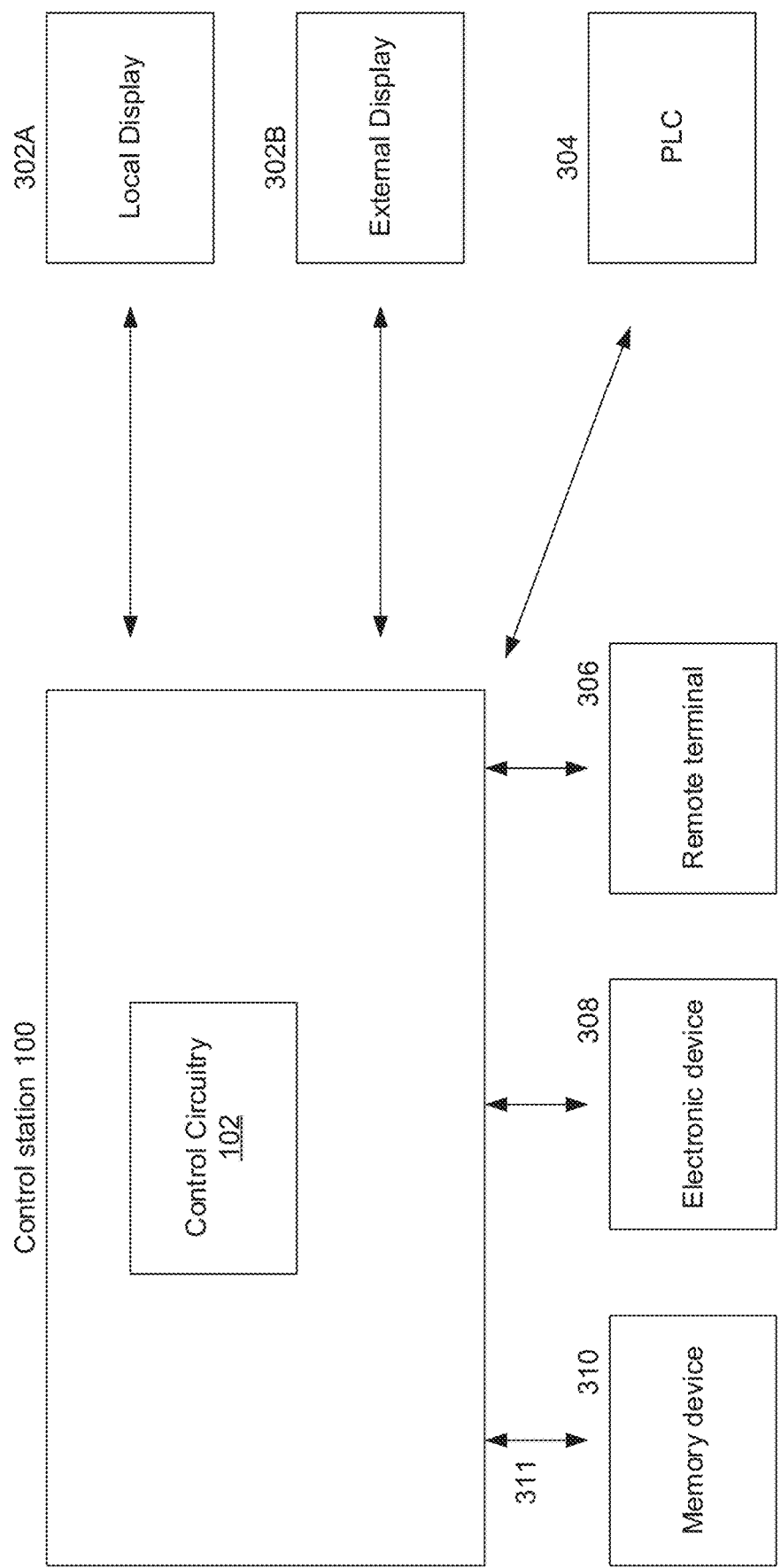
FIG. 3 is a drawing of an example control station in communication with various devices, in accordance with aspects of the disclosure.

FIG. 3 is a drawing of an example control station in communication with various devices. Referring to FIG. 3, there is shown the control station 100 communicating with a local display 302A, an external display 302B, a PLC 304, a remote terminal 306, an electronic device 308, and a memory device 310. The local display 302A may be an integrated part of the control station 100. The local display 302A may also be a separate display that is plugged into a video jack of the control station 100 or configured to receive the video signals wirelessly.

The external display 302B may be at another location and is not connected to the control station 100 via a video cable. The external display 302B may be integrated with another device such as, for example the PLC 304, or connected to the PLC 304 via a video cable. The external display 302B may also be connected via a cable to an electronic device 308 or receive wireless video signals from an electronic device 308 that is not the control station 100. The electronic device 308 that provides video signal to the external display 302B may be, for example, a PC, a laptop, a smartphone, a tablet PC, a server, etc., as well as the PLC 304, the remote terminal 306, the memory device 310, etc. Therefore, the term electronic device 308 may refer generally to any computing device, display device, memory device, and/or communication device, and may also refer specifically to one of these devices.

The local display 302A may be considered to be a part of the IO module 240. The information to the external display 302B may be communicated via, for example, the communication circuitry 230. If the external display 302B also has an input module, then the external display 302B may provide input to the control station 100 via the communication circuitry 230.

The PLC 304 may communicate with the control station 100 regarding the status of the devices that the PLC 304 is connected to. For example, the PLC 304 may control in part the first device 112 and the second device 114. Accordingly, the PLC 304 may provide information to the control station 100 regarding its control of the devices 112 and/or 114 and status of the devices 112 and/or 114. Additionally, when the control station 100 controls at least in part the devices 112 and/or 114, the control station 100 may provide information to the PLC 304 regarding its control of the devices 112 and/or 114 and status of the devices 112 and/or 114.

The remote terminal 306 may be, for example, similar to the fourth device 118, and accordingly may be a dedicated user interface device. The remote terminal 306 may comprise, for example, a display, which may be similar to the local display 302A or the external display 302B. The remote terminal 306 may also have an input interface to allow a user to input commands and/or responses. Accordingly, a user may use the input devices 242 to enter commands to, for example, update the control station 100 and/or one or more of the devices 112-118, or the user may use the remote terminal 306 or the PLC 304 to enter commands to update the control station 100 and/or one or more of the devices 112-118.

The electronic device 308 may be, for example, a server, a PC, a laptop, a tablet PC, a smartphone, etc.

The control station 100 may be configured to receive commands from an external device such as, for example, the PLC 304 and/or the remote terminal 306 to control one or more of the devices 112-114. Similarly, the control station 100 may be configured to transmit commands to the PLC 100 to have the PCL 304 control one or more of the devices 112-114.

The memory device 310 may be plugged into a socket in the control station 100, connected via a cable, or may communicate wirelessly with the control station 100. The line 311 may indicate a cable when a cable is used, or a wireless connection when the communication is wireless. The memory device 310 may be used as a removable storage device by the control station 100, or the memory device 310 may be used to provide updates to data and/or code for the control station 100. Therefore, the memory device 310 may be a FLASH drive, a hard drive, an optical drive, or any other type of memory device that may be suitable for storing data.

Figure 4:
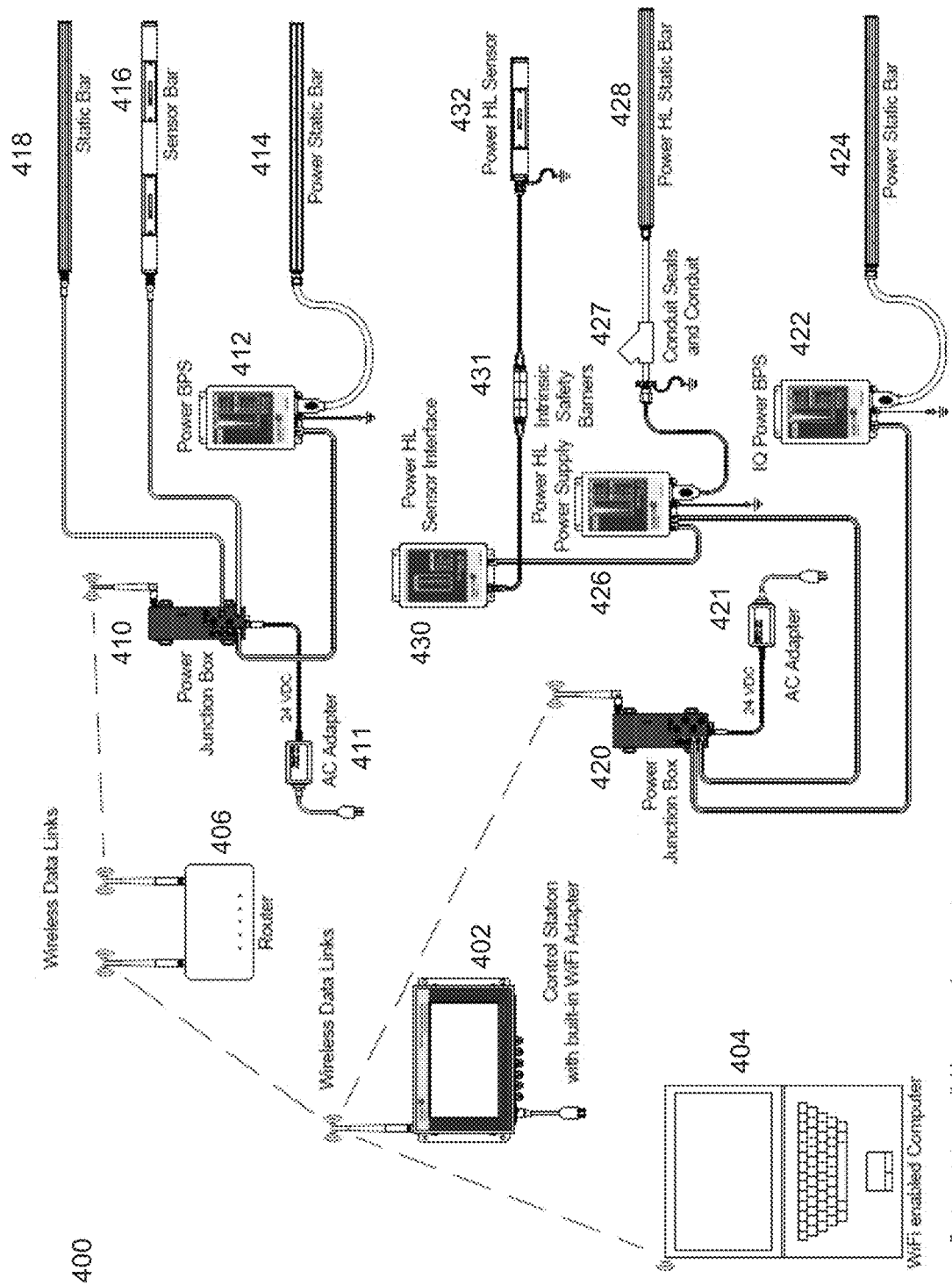
FIG. 4 is a drawing of an example control station in communication with various devices in a network, in accordance with aspects of the disclosure.

FIG. 4 is a drawing of an example control station in communication with various devices in a network, in accordance with aspects of the disclosure. Referring to FIG. 4, there is shown a network 400 with a control station 402. The control station 402 may be similar to the control station 100. Accordingly, the control station 402 may be able to communicate with various devices via wireless and/or wired communication. For example, the control station 402 may be able to communicate using the WiFi protocol.

In the network 400, the control station 402 may communicate wirelessly with a WiFi enabled computer 404, a wireless router 406, and a junction box 420. The computer 404, which may be similar to the electronic device 308 may be, for example, a PC, a desktop, a laptop, a tablet, etc. The computer 404 may be able to receive status/data of various devices connected to the network 400, and may be able to provide commands to configure the control station 402 and/or the various devices connected to the network 400.

The control station 402 may communicate with the power junction box 420 to get status/data from the power junction box 420 as well as the status/data of the various devices the power junction box 420 may be connected to. Accordingly, the control station 402 may be able to get status/data from and provide commands to the power junction box 420, the power supplies 422, 426, and the sensor interface 430. Additionally the control station 402 may be able to get status/data from and provide commands to the static bars 424, 428, and the sensor bar 432, including receiving sensor signals from the sensor bar 432.

While the control station 402 may not be able to directly communicate with the power junction box 410, the control station 402 may be able to communicate with the power junction box 410 via the wireless router 406. Accordingly, the control station 402 may be able to receive status/data from and send commands to the junction box 410, the power supply 412, the static bar 414, the sensor bar 416, and the static bar 418, including receiving sensor signals from the sensor bar 416.

Accordingly, it can be seen that the control station 402 may communicate directly with various devices as well as via access points or routers for those devices that the control station 402 cannot communicate with directly.

Figure 5:
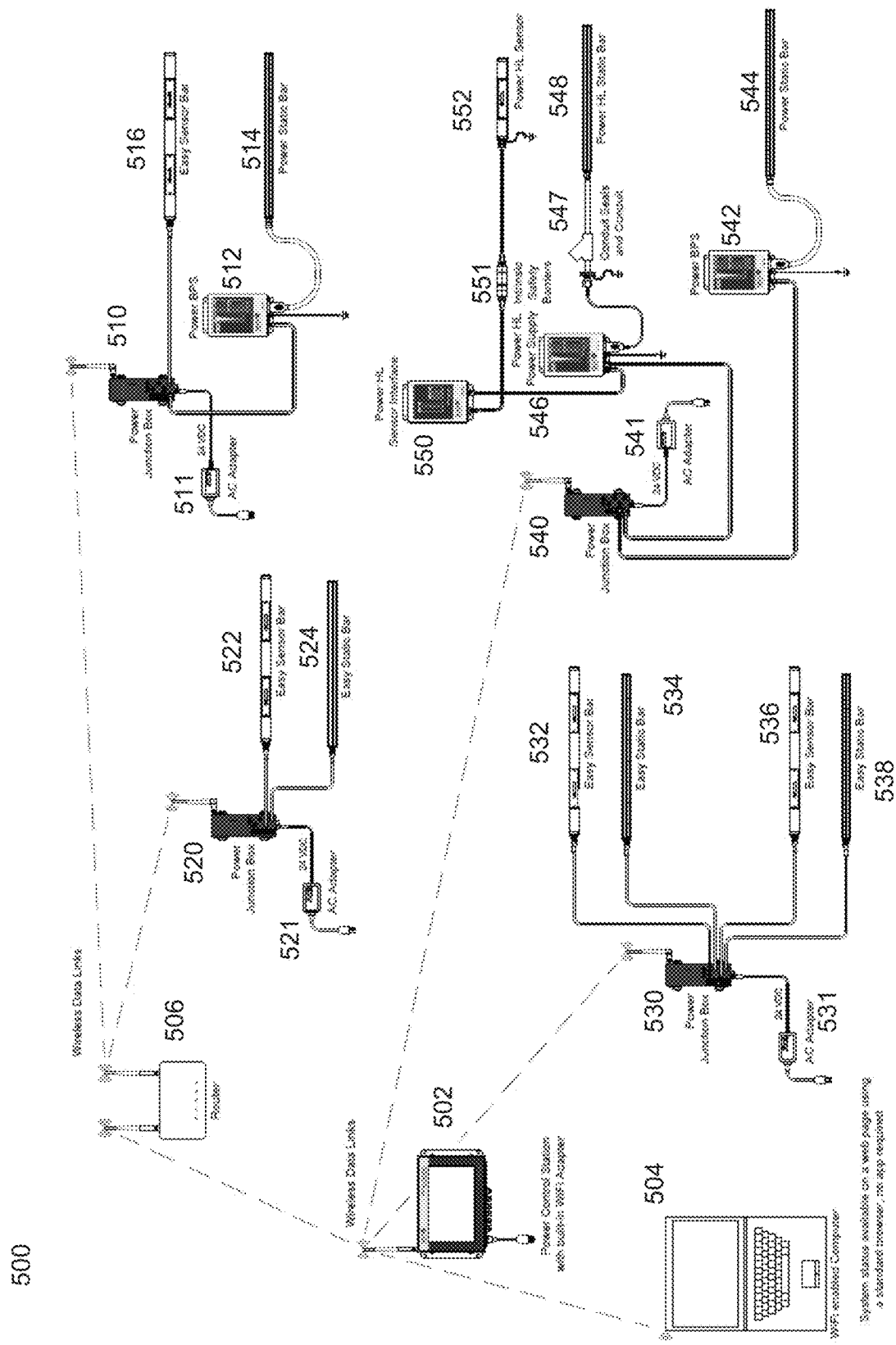
FIG. 5 is a drawing of an example control station in communication with various devices in another network, in accordance with aspects of the disclosure.

FIG. 5 is a drawing of another example control station in communication with various devices in a network, in accordance with aspects of the disclosure. Referring to FIG. 5, there is shown a network 500 with a control station 502. The control station 502 may be similar to the control station 100 and the control station 402. Accordingly, the control station 502 may be able to communicate with various devices via wireless and/or wired communication. For example, the control station 502 may be able to communicate using the WiFi protocol.

In the network 500, the control station 502 may communicate wirelessly with a WiFi enabled computer 504, a wireless router 506, and junction boxes 530 and 540. The computer 504, which may be similar to the electronic device 308 or the computer 404, may be, for example, a PC, a desktop, a laptop, a tablet, etc. The computer 504 may be able to receive status/data of various devices connected to the network 500, and may be able to provide commands to configure the control station 502 and/or the various devices connected to the network 500.

The control station 502 may communicate with the power junction boxes 530 and 540 to get status/data from the power junction boxes 530 and 540 as well as the status/data of the various devices the power junction boxes 530 and 540 may be connected to. Accordingly, the control station 502 may be able to get status/data from and provide commands to the power junction box 530, the sensor bars 532 and 536, and the static bars 534 and 538. The control station 502 may also be able to get status/data from and provide commands to the power junction box 540, the power supplies 542, 546, and 55, as well as the devices connected to those power supplies such as the static bars 544 and 548, and the sensor 552.

While the control station 502 may not be able to directly communicate with the power junction boxes 510 and 520, the control station 502 may be able to communicate with the power junction boxes 510 and 520 via the wireless router 506. Accordingly, the control station 502 may be able to receive status/data from and send commands to the junction boxes 510 and 520, the power supply 512, the static bars 514 and 524, and the sensor bars 516 and 522.

Accordingly, it can be seen that the control station 502 may communicate directly with various devices as well as via access points or routers for those devices that the control station 502 cannot communicate with directly.

Therefore, various aspects of the disclosure may provide for the control station 100, 402, or 502 may communicate with various devices in a network of various sizes.

Accordingly, various aspects of the disclosure provides for a control station 100 comprising communication circuitry 230, a first processor and a second processor as shown in any of FIGS. 2A-2D configured to communicate with one or more devices via the communication circuitry 230. For ease of explanation, the first processor will be referred to as the processor 210A and the second processor will be referred to as the processor 210B. However, this does not presume that FIG. 2C is the only configuration for two processors, nor does this limit the various aspects of the disclosure to only two processors.

Information from the one or more devices 112-114 (and 116-118, as appropriate) are configured to be processed by at least one of the first processor 210A and the second processor 210B, and at least one of the first processor 210A and the second processor 210B is configured to output the processed information to one or more of the electronic display 302A of the control station 100, the display 302B external to the control station 100, and the server 308.

The communication comprises the second processor 210B polling the one or more devices 112-114. The second processor 210B is configured to assign each of the one or more devices 112-114 a pre-determined time period in which to respond to polling of that device, wherein the pre-determined time period is one of a plurality of pre-determined time periods.

The second processor 210B is configured to, when a particular device does not respond by an end of its time period, log a timeout error against the particular device. When a pre-determined number of timeout errors is logged against the particular device, the control station 100 is configured to provide a warning. The warning may be one or more of an audible warning via the speaker in the output devices 244, or a visual warning via the display 302A and/or 302B, or a tactile warning via a vibration motor that may be one of the output devices 244. The warning may also be communicated to an electronic device 308, which may log the error and/or provide a warning of its own.

The communication circuitry 230 may be configured to receive a message of a critical message type from a particular one of the one or more devices 112-114 during one or both of the time period assigned to the particular device and outside of the time period assigned to the particular device, wherein the critical message type is pre-determined. The critical warning may be sent by any of the devices 112-114 at any time, even outside of the polling time period assigned for that device. Accordingly, any event deemed to be critical by a device may be communicated to the control station 100 quickly without having to wait until that device is polled by the control station 100. As a device that initiates communication may be considered to be a master, the control station 100 is the nominal master. However, when any of the devices 112-114 sends a critical message, that device may now be considered the master until the control station 100 starts polling again.

The second processor 210B is configured to change the assigned time period of a particular one of the one or more devices 112-114 based on at least one response time of the particular device.

A code update for updating code executed by one or more of the first processor 210A, the second processor 210B, or at least one of the one or more devices 112-114 is configured to be received via the communication circuitry 230. When the code update is for at least one of the one or more devices 112-114, the control station 100 may control updating the one or more devices 112-114. When the code update is for the at least one of the one or more devices 112-114, the control station 100 may communicate the update code to the one or more devices 112-114.

One of the first processor 210A or the second processor 210B may be configured to read the code update to determine whether the code update is for at least one of the one or more devices 112-114. When the code update is determined to be for at least one of the one or more devices 112-114, the second processor 210B is configured to perform one of: communicate the update code to the one or more devices 112-114 and perform updating the one or more devices 112-114.

The code update may be for a plurality of the one or more devices 112-114, and the control station 100 may be configured to communicate the update code to two or more of the devices 112-114.

The code update may be provided, for example, via an external memory device such as the memory device 310, which may be coupled to the control station 100 using a communication cable 311, which may be, for example, a universal serial bus (USB) cable. The external memory device 310 may be, for example, a FLASH memory drive.

Updating the code may start automatically when the external memory device 310 with the code update is coupled to the control station 100 via the communication circuitry 230. Alternatively, updating the code may start after receiving an input from a user, where the input from the user may comprise a selection of which of the one or more devices 112-114 to update.

The second processor 210B may be configured to communicate with one or more devices 112-114 wirelessly. At least one of the first processor 210A and the second processor 210B may be configured to update configuration information for a newly connected hardware. A "newly connected" hardware may be any device that is attached to at least be polled by the control station 100. Accordingly, the newly connected device may be a device that is added to increase the number of the existing devices 112-114 or to replace one of the existing devices 112-114.

At least one of the first processor 210A and the second processor 210B may be configured to output the processed information to one or more formatted screen views, where the one or more formatted screen views comprise hidden screen views that may be for access by authorized personnel.

The communication circuitry 230 may be configured to address each of the one or more devices 112-114 with a unique product identifier. The product identifier may be an identifier that is unique to the particular device, or may be a unique identifier that is assigned to a device by the control station 100. The assigned identifier may be, for example, a simple number, or the assigned identifier may be based on characteristics of the device, such as type of device, manufacture of the device, serial number of the device, etc. As can be seen, an identifier may be generated in many different ways.

The communication by the control station 100, whether wired or wireless, may be via a proprietary format.

Various aspects of the disclosure may also provide for a control station 100 comprising a local display 302A, communication circuitry 230, a first processor 210A configured to run an operating system 222 and at least one application 224, and a second processor 210B configured to communicate via the communication circuitry 230 with one or more static charging device 114 and/or one or more sensor device 112, wherein information from the at least one static charging device 114 is configured to be processed by the second processor 210B, and wherein the first processor 210A is configured to output the processed information to the display 302A.

Still other aspects of the disclosure may provide for a control station 100 comprising communication circuitry 230 configured for one or both of wireless communication and wired communication, a first processor 210A configured to run an operating system 222 and at least one application 224, and a second processor 210B configured to communicate with one or both of a static charging device 114 and a sensor 112 via the communication circuitry 230, where information from one or both of the static charging device 114 and a sensor 112 is configured to be processed by at least one of the first processor 210A and the second processor 210B, and at least one of the first processor 210A and the second processor 210B is configured to output the processed information to device such as, for example, the memory device 310, the electronic device 308, the remote terminal 306, the PLC 304, the external device 302B and/or the local display 302A.

The communication comprises the second processor 210B polling at least the static charging device 114 and a sensor 112. The second processor 210B may be configured to assign each of the one or more devices a pre-determined time period in which to respond to polling of that device, where the pre-determined time period is one of a plurality of pre-determined time periods. The second processor 210B may also be configured to, when a particular device does not respond by an end of its time period, log a timeout error against the particular device. The second processor 210B may further be configured to change the assigned time period of a particular one of the one or more devices based on at least one response time of the particular device.

As can be seen, at least some of the present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What are claimed:

1. A control station, comprising:
   communication circuitry;
   a first processor; and
   a second processor configured to communicate with one or more devices via the communication circuitry,
     wherein the second processor is configured to process information from the one or more devices and to poll the one or more devices,
     wherein the second processor is configured to determine a pre-determined time period associated with each of the one or more devices in which to respond to polling of that device,
     wherein the second processor is configured to change a polling period for the one or more devices based on at least one response time of the one or more devices, and
     wherein at least one of the first processor and the second processor is configured to output the processed information to one or more of: an electronic display of the control station, a display external to the control station, a server, and an electronic device.

2. The control station of claim 1, wherein the second processor is configured to, when a particular device does not respond by an end of its pre-determined time period, log a timeout error against the particular device.

3. The control station of claim 2, wherein, when a pre-determined number of timeout errors is logged against the particular device, the control station is configured to provide a warning.

4. The control station of claim 3, wherein the warning is one or more of: an audible warning, a visual warning, or a tactile warning.

5. The control station of claim 3, wherein the warning is communicated to an electronic device.

6. The control station of claim 1, wherein the communication circuitry is configured to receive a message of a critical message type from a particular device of the one or more devices during one or both of the pre-determined time period associated with the particular device and outside of the pre-determined time period associated with the particular device, wherein the critical message type is pre-determined.

7. The control station of claim 1, wherein the second processor configured to communicate with the one or more devices wirelessly.

8. The control station of claim 1, wherein at least one of the first processor and the second processor is configured to update configuration information for a newly connected hardware.

9. The control station of claim 1, wherein at least one of the first processor and the second processor is configured to output the processed information to one or more formatted screen views.

10. The control station of claim 9, wherein the one or more formatted screen views comprise hidden screen views for access by authorized personnel.

11. The control station of claim 1, wherein the communication circuitry addresses each of the one or more devices with a unique product identifier.

12. The control station of claim 1, wherein the communication is via a proprietary format.

13. A control station, comprising:
    communication circuitry configured for one or both of wireless communication and wired communication;
    a first processor configured to run an operating system and at least one application; and
    a second processor configured to communicate with one or both of a static control device and a sensor via the communication circuitry,
      wherein the second processor is configured to process information from the one or both of a static control device and a sensor to the one or both of the static control device and the sensor,
      wherein the second processor is configured to determine a pre-determined time period associated with each of the one or both of the static control device and the sensor in which to respond to polling of that device,
      wherein the second processor is configured to change a polling period for one or both of the static control device and the sensor based on at least one response time of the one or more devices, and
      wherein at least one of the first processor and the second processor is configured to output the processed information to an electronic device.

14. The control station of claim 13, wherein the second processor is configured to, when a particular device does not respond by an end of its pre-determined time period, log a timeout error against the particular device.

15. A control station comprising:
    communication circuitry;
    a first processor configured to run an operating system and at least one application; and
    a second processor configured to poll a plurality of devices via the communication circuitry,
      wherein the second processor is configured to determine a pre-determined time period associated with each of the plurality of devices in which to respond to polling of that device,
      wherein the second processor is configured to receive, via the communication circuitry, a message of a critical message type from a particular device of the plurality of devices during one or both of the pre-determined time period associated with the particular device and outside of the pre-determined time period associated with the particular device, and
      wherein the second processor is configured to output a warning to an electronic device during one or both of the pre-determined time period associated with the particular device and outside of the pre-determined time period associated with the particular device.

16. The control station of claim 15, wherein the electronic device is an electronic display of the control station, a display external to the control station, or a server.

17. The control station of claim 15, wherein the plurality of devices comprises a static control device and a sensor.

18. The control station of claim 15, wherein the second processor is configured to communicate with at least one of the plurality of devices wirelessly.

19. The control station of claim 15, wherein the second processor is configured to log a timeout error against a particular device when that particular device does not respond by an end of its pre-determined time period.

20. The control station of claim 15, wherein the second processor is configured to change a polling period for the plurality of devices based on at least one response time of the plurality of devices.

* * * * *